United States Patent
Zhou et al.

(10) Patent No.: US 11,855,288 B2
(45) Date of Patent: Dec. 26, 2023

(54) LOW-SWELLING GRAPHITE ANODE MATERIAL, PREPARATION METHOD THEREOF AND LITHIUM ION BATTERY

(71) Applicant: BTR NEW MATERIAL GROUP CO., LTD., Shenzhen (CN)

(72) Inventors: Haihui Zhou, Shenzhen (CN); Dongdong Li, Shenzhen (CN); Xiujun Pan, Shenzhen (CN)

(73) Assignee: BTR NEW MATERIAL GROUP CO., LTD, Shenzhen (CN)

( * ) Notice: Subject to any disclaimer, the term of this patent is extended or adjusted under 35 U.S.C. 154(b) by 714 days.

(21) Appl. No.: 17/043,378

(22) PCT Filed: Aug. 1, 2019

(86) PCT No.: PCT/CN2019/098886
§ 371 (c)(1),
(2) Date: Sep. 29, 2020

(87) PCT Pub. No.: WO2020/125018
PCT Pub. Date: Jun. 25, 2020

(65) Prior Publication Data
US 2021/0020941 A1    Jan. 21, 2021

(30) Foreign Application Priority Data
Dec. 17, 2018 (CN) .......................... 201811541572.5

(51) Int. Cl.
*H01M 4/587* (2010.01)
*C01B 32/21* (2017.01)
(Continued)

(52) U.S. Cl.
CPC ............. *H01M 4/587* (2013.01); *C01B 32/21* (2017.08); *H01M 10/0525* (2013.01);
(Continued)

(58) Field of Classification Search
CPC ............. H01M 4/587; H01M 10/0525; H01M 2004/027; H01M 4/38; C01B 32/21;
(Continued)

(56) References Cited

U.S. PATENT DOCUMENTS

2011/0165464 A1    7/2011    Yew

FOREIGN PATENT DOCUMENTS

CN    101931077 A    12/2010
CN    104766955 A    7/2015
(Continued)

OTHER PUBLICATIONS

Machine translation of WO 2017/206544 to Tian (Jul. 2017) (Year: 2017).*

(Continued)

*Primary Examiner* — Daniel C. McCracken
(74) *Attorney, Agent, or Firm* — TUCKER ELLIS LLP

(57) ABSTRACT

A low-swelling graphite anode material, a preparation method thereof, and a lithium ion battery including the graphite anode material. The preparation method of the graphite anode material includes: (1) mixing a graphite raw material with a modifier, and then performing heating modification; (2) performing heat treatment on the modified graphite under a protective atmosphere; and (3) performing post-treatment on the heat-treated graphite to obtain the graphite anode material. The graphite anode material has an extremely low swelling rate, excellent cycle performance, and outstanding rate performance, an swelling rate being 24.3% or lower, a normal temperature 10C/1C discharge capacity retention rate being greater than 90%, and a capacity retention rate after charging and discharging for 300 times being 91% or greater.

19 Claims, 1 Drawing Sheet

(51) Int. Cl.
*H01M 10/0525* (2010.01)
*H01M 4/02* (2006.01)

(52) U.S. Cl.
CPC ...... *C01P 2004/03* (2013.01); *C01P 2004/61* (2013.01); *C01P 2006/11* (2013.01); *C01P 2006/12* (2013.01); *C01P 2006/40* (2013.01); *H01M 2004/027* (2013.01)

(58) Field of Classification Search
CPC ... C01B 32/182; C01B 32/184; C01B 32/186; C01B 32/188; C01B 32/19; C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/215; C01B 32/22; C01B 32/225; C01B 32/23; C01P 2004/03; C01P 2004/61; C01P 2006/11; C01P 2006/12; C01P 2006/40; Y02E 60/10
See application file for complete search history.

(56) References Cited

FOREIGN PATENT DOCUMENTS

| | | | | |
|---|---|---|---|---|
| CN | 105047929 | A | 11/2015 | |
| CN | 105074976 | A | 11/2015 | |
| CN | 105731427 | A | 7/2016 | |
| CN | 105810946 | A * | 7/2016 | ............ H01M 4/583 |
| CN | 106252662 | A | 12/2016 | |
| CN | 106395811 | A | 2/2017 | |
| CN | 106654235 | A | 5/2017 | |
| CN | 107381563 | A | 11/2017 | |
| CN | 107534148 | A | 1/2018 | |
| CN | 108063229 | A | 5/2018 | |
| CN | 108832091 | A | 11/2018 | |
| WO | 2016031083 | A1 | 3/2016 | |
| WO | WO 2017/206544 | * | 7/2017 | ............ H01M 4/583 |
| WO | 2018145765 | A1 | 8/2018 | |

OTHER PUBLICATIONS

Machine translation of CN 105810946A to Tian (Jul. 2016) (Year: 2016).*
Top Five Grinding and milling technics for Graphite, accessed online at https://orebeneficiation.wordpress.com/2012/01/24/top-five-grinding-and-milling-technics-for-graphite/ (Jan. 24, 2012) (Year: 2012).*
Office Action from corresponding Chinese Application No. 201811541572.5, dated Jul. 4, 2022, 14 pages with translation.
The extended European Search Report from corresponding European Patent Application No. 19900650, dated Nov. 29, 2021, 7 pages.
Office Action from corresponding Japanese Patent No. 2020-570769, dated Nov. 22, 2021, 14 pages with translation.
International Search Report from corresponding International Application No. PCT/CN2019/098886 dated Nov. 4, 2019, 6 pages including translation.
Office Action from corresponding Chinese Application No. 201811541572.5, dated Dec. 19, 2022, 16 pages with translation.
Notice of Allowance from corresponding Japanese Application No. 2020-570769, dated Sep. 21, 2022; 5 pages with translation.
Shimo Jiagong et al.: "Graphite processing and Graphite Material"; China University of Mining and Technology Press; 34 pages with translation.
Wang Zhenting et al.: "Method and technology of graphite purification", Harquang University of Technology Press; dated 2016; 12 pages.

* cited by examiner

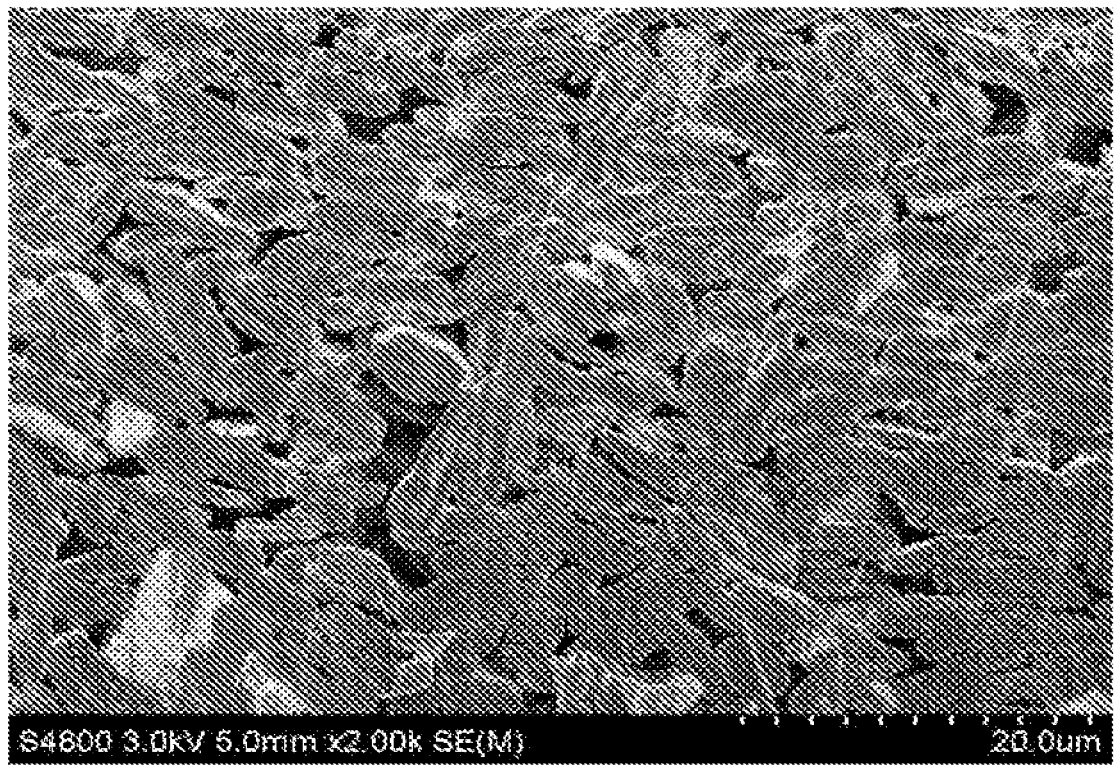

LOW-SWELLING GRAPHITE ANODE MATERIAL, PREPARATION METHOD THEREOF AND LITHIUM ION BATTERY

TECHNICAL FIELD

The present application pertains to the field of battery materials, and relates to an anode material, for example, a low-swelling graphite anode material, a preparation method thereof, and a lithium ion battery.

BACKGROUND

According to the latest data from the National Bureau of Statistics, approximately 70% of petroleum in China is dependent upon import, and the imported petroleum comes from the countries that are now in unstable political situation such as Iraq, Syria, and Iran. Therefore, the national energy security is facing huge challenges. Since more than 50% of imported petroleum is consumed by vehicles, the development of new energy vehicles, especially pure electric vehicles, is directly related to national energy security and is the general trend in the future. In this regard, the government has introduced a large number of preferential and subsidy policies. Under the policy promotion, electric vehicles that use lithium-ion batteries as the power source have developed rapidly. However, due to the high cost of lithium-ion batteries, the electric vehicles have not been fully accepted by consumers, and thus have not been really commercialized so far. Therefore, it is a focus of the future development of power batteries to further lower the cost of lithium-ion batteries.

An anode material is an important component of lithium ion battery, and has great impact on the cost and performance of the battery. Currently, graphite is still the dominant material of the anode materials. Graphite can be classified into artificial graphite and natural graphite according to the crystal formation method. Natural graphite is widely used in lithium ion batteries and most common in conventional lithium ion battery application fields such as 3C, and it is gradually being promoted to the field of power batteries as it does not require high-temperature graphitization and has low cost and high capacity. However, the natural graphite has a high swelling rate during cycling, which may result in poor cycle performance, and thus its advantages with respect to costs are no longer outstanding in the power battery. Therefore, it is also a focus of current research on natural graphite to solve the problem of the excessively high swelling ratio of natural graphite and further reduce the cost of natural graphite.

At the current stage, the natural graphite anode material is mainly spherical graphite, which is obtained by mechanically crushing flake graphite. During the crushing process, the flake graphite is gradually bent, folded, and then spheroidized under external force. When it is used as a lithium-ion anode material, lithium ions can enter a layered structure of the flake graphite during charging, and they may change a thickness of the layer as well as stable stress structure in the spheroidization process, and accordingly, the spherical structure will also change, thereby resulting in an increase in the swelling rate. Since the performances are determined by the structure, it shall start with changing the structure to solve the problem of large swelling rate of the natural graphite. In addition, the above spheroidization process requires multiple times of crushing, leading to a low yield (generally a comprehensive yield is less than 70%). Thus, a large amount of flake graphite is wasted and can only be used as low value-added products such as carburizing agents.

CN106252662A discloses a method for preparing low-swelling graphite, including the following steps: (1) crushing and shaping flake graphite raw material to a particle size of D50 of 5-10 μm; (2) mixing the flake graphite raw material with an easily graphitizable binder and a graphitization catalyst; (3) under protection of inert gas, performing low-temperature heat treatment at 300-800° C. for 10-20 hours, and then cooling to room temperature; (4) under protection of inert gas, performing catalytic graphitization high-temperature treatment at 2800-3200 ° C. for 24-48 hours; and (5) screening the mixture to obtain low-swelling graphite. The deficiency of such a method is in that the swelling rate of the product is still high, and the electrochemical performance is still required to be enhanced.

CN106395811A teaches a method for preparing low-swelling long-cycle natural graphite, including the following processing steps: (1) crushing and shaping; (2) mixing; (3) low-temperature heat treatment; (4) graphitization high-temperature treatment; and (5) screening the mixture. The easily graphitizable binder is one or more of petroleum pitch, coal pitch, phenolic resin, epoxy resin, furan resin or furfural resin, and is used in an amount of 10-30% by weight of the raw material of microcrystalline graphite. This method has the deficiencies that the swelling rate of the product is still high, and the electrochemical performance is still required to be enhanced.

Therefore, it is of great significance in the related art to develop a method for preparing a graphite anode with a low swelling rate and good electrochemical performance.

SUMMARY

The following is a summary of subject matters, which are described in detail in the present disclosure. The summary is not intended to limit the protection scope of the claims.

An object of the present application is to provide a low-swelling graphite anode material, a preparation method thereof, and a lithium ion battery. The graphite anode material provided by the present application solves the problem of high swelling rate of natural graphite, and has excellent cycle performance and rate performance.

For the above object, the present application adopts the following technical solutions.

In a first aspect, the present application provides a preparation method of a graphite anode material, and the method includes the following steps: step 1 of mixing and then heating a graphite raw material and a modifier to obtain a modified graphite; step 2 of performing a heat treatment on the modified graphite obtained in step 1 under a protective atmosphere to obtain a heat-treated graphite; and step 3 of subjecting the heat-treated graphite in step 2 to a post-treatment to obtain the graphite anode material.

In the preparation method provided by the present application, the heat treatment in step 2 is a carbonization treatment.

The preparation method provided by the present application has a short process flow, is easy to be performed, and is suitable for industrial mass production.

The following are optional technical solutions of the present application, but are not intended to limit the technical solutions provided by the present application. Through the following optional technical solutions, the object and beneficial effects of the present application can be reached and achieved.

As an optional technical solution of the present application, the graphite raw material in step 1 is a natural graphite.

Optionally, the natural graphite includes flake graphite.

Optionally, the flake graphite is flake crystalline graphite obtained by processing natural graphite ore.

Optionally, a carbon content of the flake graphite is greater than or equal to 95%, for example, 95%, 96%, 97%, 98%, or 99%, etc.

Optionally, the graphite raw material in step 1 is first subjected to a pretreatment before being mixed with the modifier.

Optionally, the pretreatment in step 1 includes crushing and grading. The pretreatment method of crushing and grading can change parameters such as a particle size D50 and specific surface area of the graphite raw material, allow the graphite raw material to be more suitable for the preparing graphite anode materials according to the present application.

Optionally, the crushing is mechanical crushing.

In the present application, by optimizing the crushing process, a crushing yield has been greatly improved, reaching 80% or greater, such that the product provided in the present application is more cost-effective than the conventional natural graphite products.

Optionally, the grading is performed with a grading machine.

Optionally, the pretreatment further includes shaping.

Optionally, the shaping is performed with a shaping machine.

As an optional technical solution of the present application, the graphite raw material in step 1 has an ellipsoid appearance or irregular cuboid appearance, and a flaky internal structure.

The graphite raw material in step 1 can be regarded as mainly being formed by folding natural flake graphite 2-3 times.

Optionally, the graphite raw material in step 1 has a particle size D50 of 8 μm to 13 μm, for example, but not limited to, 8 μm, 9 μm, 10 μm, 11 μm, 12 μm, or 13 μm, etc., and other unmentioned values within the range are also applicable; and 3≤D90/D10≤4, for example, but not limited to, 3, 3.1, 3.2, 3.3, 3.4, 3.5, 3.6, 3.7, 3.8, 3.9, or 4, etc.; and other unmentioned values within the range are also applicable. In the present application, if the particle size D50 of the graphite raw material in step 1 is too large, the swelling rate of the final product will be significantly increased; and if the particle size D50 of the graphite raw material in step 1 is too small, more times of crushing are required, which may reduce the yield of finished products and thus increase the cost of the pretreatment of the graphite raw material. If the graphite raw material has an initial particle size beyond the above range, it can be pretreated to adjust the particle size to fall within the above-mentioned optional ranges.

Optionally, the graphite raw material in step 1 has a tap density of greater than or equal to 0.9 g/cc, such as 0.9 g/cc, 1 g/cc, 1.1 g/cc, or 1.2 g/cc, etc.

Optionally, the graphite raw material in step 1 has a specific surface area of 3 $m^2/g$ to 10 $m^2/g$, for example, but not limited to, 3 $m^2/g$, 4 $m^2/g$, 5 $m^2/g$, 6 $m^2/g$, 7 $m^2/g$, 8 $m^2/g$, 9 $m^2/g$ or 10 $m^2/g$, etc.; and other unmentioned values within the range are also applicable.

As an optional technical solution of the present application, a softening point of the modifier in step 1 is 50° C. to 400° C., for example, but not limited to, 50° C., 100° C., 150° C., 200° C., 250° C., 300° C., 350° C. or 400° C., etc.; and other unmentioned values within the range are also applicable.

Optionally, the modifier in step 1 is selected from the group consisting of phenolic resin, epoxy resin, petroleum resin, coal pitch, petroleum pitch, mesophase pitch, coal tar, heavy oil, and combinations thereof. Typical combinations include, but not limited to, a combination of phenolic resin and epoxy resin, a combination of petroleum resin and coal pitch, a combination of petroleum pitch and mesophase pitch, a combination of coal tar and heavy oil, etc.

Optionally, in step 1, a mass ratio of the graphite raw material to the modifier ranges from 1:0.05 to 1:1, for example, but not limited to, 1:0.05, 1:0.1, 1:0.2, 1:0.3, 1:0.4, 1:0.5, 1:0.6, 1:0.7, 1:0.8, 1:0.9, or 1:1, etc.; and other unmentioned values within the range are also applicable.

Optionally, the method further includes: adding a pore-forming agent when mixing the graphite raw material and the modifier in step 1.

In the preparation method provided by the present application, under the combination of the modifier and the pore-forming agent, the pore structure, and inner and outer surfaces of the natural graphite raw material are optimized through the heating process of step 1. In this way, the final prepared graphite anode material has a low-swelling rate, outstanding cycle performance and rate performance, and thus it is an excellent low-swelling graphite anode material.

In the preparation method provided by the present application, the use of the interworking modifier and pore-forming agent plays a very important role in improving the electrochemical performance and reducing the swelling rate of the finally prepared graphite anode material. Specifically, during the heating in step 1, the particle size of the graphite raw material will increase by 1-5 μm under the action of the modifier, a part of the modifier will enter the interior of the natural graphite, while the pore-forming agent is evenly distributed in the modifier, and the pore structure of the product can be effectively controlled by the addition of the pore-forming agent, thereby ultimately improving the electrochemical performance of the product and reducing the swelling rate.

Optionally, the pore-forming agent is a water-soluble salt pore-forming agent.

Optionally, the water-soluble salt pore-forming agent is selected from the group consisting of sodium chloride, potassium chloride, potassium nitrate, sodium nitrate, sodium sulfate, potassium sulfate, and combinations thereof; and typical combinations include, but not limited to, a combination of sodium chloride and potassium chloride, a combination of potassium nitrate and sodium nitrate, a combination of sodium sulfate and potassium sulfate, etc.

Optionally, in step 1, based on 100 wt % of a total mass of the graphite raw material, the modifier and the pore-forming agent, a mass fraction of the pore-forming agent is greater than 0wt % and smaller than or equal to 10 wt %, for example, 1 wt %, 2 wt %, 3 wt %, 4 wt %, 5 wt %, 6 wt %, 7 wt %, 8 wt %, 9 wt % or 10 wt %, etc., and optionally ranging from 4 wt % to 6 wt %. In the present application, if the amount of the added pore-forming agent is too high, the specific surface area of the final product will be too great, and the first coulombic efficiency of the battery will be reduced; and if the amount of the added pore-forming agent is too low, it will lead to unsatisfactory pore-forming effect, resulting in a poor rate performance of the material.

As an optional technical solution of the present application, the heating in step 1 is performed at a temperature of 50° C. to 800° C., for example, but not limited to, 50° C., 60° C., 70° C., 80° C., 90° C., 100° C., 200° C., 300°

C., 400° C., 500° C., 600° C., 700° C. or 800° C., etc.; and other unmentioned values within the range are also applicable.

Optionally, a time duration of the heating in step 1 is greater than 0 min and shorter than or equal to 300 min, for example 30, 60 min, 100 min, 120 min, 160 min, 200 min, 250 min, or 300 min, etc., and optionally ranging from 120-180 min.

Optionally, the heating in step 1 is performed under stirring.

As an optional technical solution of the present application, the protective atmosphere in step 2 is selected from the group consisting of a helium atmosphere, a neon atmosphere, an argon atmosphere, a nitrogen atmosphere, a krypton atmosphere, and combinations thereof.

Optionally, the heat treatment in step 2 is performed at a temperature of 1000° C. to 3000° C., for example, but not limited to, 1000° C., 1500° C., 2000° C., 2500° C. or 3000° C., etc.; and other unmentioned values within the range are also applicable.

Optionally, the heat treatment in step 2 is performed for 1-10 h, for example, but not limited to, 1 h, 2 h, 3 h, 4 h, 5 h, 6 h, 7 h, 8 h, 9 h or 10 h, etc.; and other unmentioned values within the range are also applicable.

As an optional technical solution of the present application, the post-treatment in step 3 includes: subjecting the heat-treated graphite in step 2 to soaking, solid-liquid separation, drying, scattering and sieving.

Optionally, said soaking is soaking in water.

Optionally, the solid-liquid separation is filtration.

As a further optional technical solution of the preparation method described in the present application, the method includes: step 1' of mechanical crushing flake graphite, grading with a grading machine, and shaping with a shaping machine to obtain a pretreated graphite raw material, wherein the flake graphite is flake crystalline graphite obtained by processing natural graphite ore, and has a having a carbon content greater than or equal to 95%; and the pretreated graphite raw material has an ellipsoid appearance or an irregular cuboid appearance and a flaky internal structure, a particle size D50 of 8 μm to 13 μm, 3≤D90/D10≤4, a tap density≥0.9 g/cc, and a specific surface area of 3 $m^2$/g to 10 $m^2$/g; step 2' of mixing the pretreated graphite raw material in step 1' with a modifier and a water-soluble salt pore-forming agent, and then performing heating at a temperature of 50° C. to 800° C. for 120 min to 180 min under stirring, to obtain the modified graphite, wherein a mass ratio of the pretreated graphite raw material to the modifier ranges from 1:0.05 to 1:1, and based on 100 wt % of a total mass of the pretreated graphite raw material, the modifier and the water-soluble salt pore-forming agent, a mass fraction of the water-soluble salt pore-forming agent ranges from 4 wt % to 6 wt %, and the soluble salt pore-forming agent is selected from the group consisting of sodium chloride, potassium chloride, potassium nitrate, sodium nitrate, sodium sulfate, potassium sulfate, and combinations thereof; step 3' of performing the heat treatment on the modified graphite described in step 2' under a protective atmosphere at 1000° C. to 3000° C. for 1 h to 10 h, to obtain the heat-treated graphite; and step 4' of soaking the heat-treated graphite in step 3' in water, then filtering, then drying, scattering and sieving, to obtain the graphite anode material.

In a second aspect, the present application provides a graphite anode material prepared by the preparation method described in the first aspect.

The swelling rate of the graphite anode material provided in the present application is reduced by about 20% compared with the conventional natural graphite material, which is comparable to artificial graphite. The graphite anode material provided in the present application has a low-swelling rate and an optimal pore structure, and thus has excellent cycle performance and outstanding rate performance.

In a third aspect, the present application provides a lithium-ion battery including the graphite anode material according to the second aspect.

The lithium ion battery provided in the present application is suitable for pure electric vehicles and hybrid vehicles.

Compared with the related art, the present application has the following beneficial effects.

(1) The low-swelling graphite anode material provided by the present application has extremely low swelling rate, excellent cycle performance and outstanding rate performance. Its swelling rate can be as low as 24.3% or ever lower, which is comparable to the artificial graphite; the normal temperature 10C/1C discharge capacity retention rate is greater than 90%, and 300 times charge and discharge capacity retention rate can reach 91% or greater. Therefore, the low-swelling graphite anode material provided in the present application is cost-effective, and the lithium ion battery prepared with such a low-swelling graphite anode material is suitable for pure electric vehicles and hybrid power car.

(2) The preparation method provided by the present application greatly improves the crushing yield of flake graphite, and reduces the overall cost of the material. In addition, through the cooperation of the modifier and the pore-forming agent during the heating process, the electrochemical performance of the product is improved and the swelling rate is reduced. In addition, the preparation method provided by the present application has a short process flow, and it is easy to be performed and suitable for industrial mass production.

Other aspects will be clear upon reading and understanding the detailed description with reference to accompanying drawings.

BRIEF DESCRIPTION OF DRAWINGS

FIG. 1 is a scanning electron microscope image (sectional view) of a pretreated graphite raw material obtained in step 1 of the preparation method provided in Example 1 of the present application.

DESCRIPTION OF EMBODIMENTS

The technical solutions of the present application is are further described below h with reference to specific embodiments. Those skilled in the art can understand that that these embodiments are merely to help to explain the present application, but are not intended to limit the present application.

Typical examples of the present application are described below, but the present application is not limited to these examples.

Example 1

In this example, a low-swelling graphite anode material was prepared according to the following method.

(1) 100-mesh flake graphite (having a carbon content greater than or equal to 95%) was mechanically crushed, graded with a grading machine, and shaped with a shaping machine to obtain a pretreated graphite raw material. The pretreated graphite raw material has a particle size D50 of 11.1 μm, a tap density of 0.902 g/cc, D90/D10 of 3.6, a specific surface area of 6.2 m²/g. The pretreated graphite raw material had an ellipsoid appearance or an irregular cuboid appearance, and has a flaky internal structure, with a yield of 81%.

(2) The pretreated graphite was mixed with coal pitch (having a softening point of 110° C.) and sodium chloride in a mass ratio of 0.75:0.20:0.05, and then the mixture was placed into a stirring heating tank for stirring and heating, during which the highest temperature was 350° C., and the temperature was held for 3 hours, to obtain a modified graphite.

(3) The modified graphite was subjected to a heat treatment at 2200° C. under an argon atmosphere for 5 hours to obtain a heat-treated graphite.

(4) The heat-treated graphite was soaked in water, filtered, dried, scattered and sieved to obtain the graphite anode material.

In this example, the particle size of the pretreated graphite raw material in step 1 was measured with Malvern laser particle size analyzer, the specific surface area was measured using JWGB specific surface area analyzer, the tap density was measured using the tap density meter (Auto Tap), and the morphology of the pretreated graphite raw material in step 1 was tested using a scanning electron microscope. The pretreated graphite raw material in step 1 in other examples was also characterized using the above-mentioned instruments.

The graphite anode material prepared in this example was subjected to an swelling rate test according to with the following method.

The graphite anode material obtained in this example was used as an anode active material, mixed with CMC and SBR uniformly according to a mass ratio of 96.5: 1.5: 2 (active material: CMC: SBR), then the mixture was coated on one side of a copper foil current collector, and dried to obtain an anode plate for use.

A cathode active material LiCoO₂, a conducting agent, and PVDF were uniformly mixed in a mass ratio of 96.5: 2:1.5, and then coated on one side of an aluminum foil to obtain a cathode plate.

The positive and anode plates prepared as above were loaded into a self-made three-electrode test device for testing. The three-electrode test device were configured to in situ record a thickness change of the electrode plate, and an swelling rate of the electrode plate could be obtained through calculation.

The graphite anode material prepared in this example was subjected to an electrochemical performance test using the following method.

The graphite anode material obtained in this example was used as the anode active material and mixed uniformly with CMC and SBR according to a mass ratio of 96.5:1.5:2 (active material: CMC:SBR), and the mixture was coated on a copper foil current collector, and dried to obtain an anode plate for use.

First, the obtained electrode plate was subject to a button battery test. The battery was assembled in an argon glove box. A lithium metal sheet was used as the anode. The electrolyte was 1 mol/L of a mixture of LiPF₆+EC+EMC. The separator was a polyethylene/propylene composite microporous membrane. The electrochemical performance was measured with a battery testing instrument, with a charge and discharge voltage of 0.01V to 1.5V and a charge and discharge rate of 0.1 C, to obtain capacity and first-time efficiency through the test.

Test of finished battery: the graphite anode material obtained in this example, a conducting agent, CMC and SBR were mixed in a mass ratio of 95:1.5:1.5:2 and the mixture was coated on a copper foil to obtain an anode plate. A cathode active material NCM523, a conducting agent, and PVDF were uniformly mixed in a mass ratio of 96.5:2:1.5, and then coated on an aluminum foil to obtain a cathode plate. The electrolyte was 1 mol/L of a mixture of LiPF₆+EC+EMC, and the separator was a polyethylene/propylene composite microporous membrane. The 10 C/1 C discharge capacity retention rate was measured, and the normal temperature charge and discharge were performed with a rate of 1 C, and a voltage was in a range of 2.75V to 4.2V, to measured capacity retention rate after 300 cycles.

The test results of the above-mentioned swelling rate and electrochemical performance are listed in Table 1.

FIG. 1 is a scanning electron microscope image (sectional view) of the pretreated graphite raw material obtained in step 1 of the preparation method provided in this example. It can be seen from the image that the prepared raw material is an ellipsoid or an irregular cuboid, and the internal structure is a flaky structure.

Example 2

In this example, a low-swelling graphite anode material was prepared according to the following method.

(1) Flake graphite (having a carbon content greater than or equal to 95%) was mechanically crushed, graded with a grading machine, and shaped and graded with a shaping machine to obtain a pretreated graphite raw material. The pretreated graphite raw material has a particle size D50 of 11 μm, a tap density of 0.905 g/cc, D90/D10 of 3.4 and a specific surface area of 8.1 m²/g. The pretreated graphite raw material had an ellipsoid or irregular cuboid appearance, and a flaky internal structure, with a yield of about 82%.

(2) The pretreated graphite was mixed with coal pitch (having a softening point of 110° C.) and sodium chloride, and then the mixture was placed into a stirring heating tank for stirring and heating, during which the highest temperature was 350° C. and the temperature was held for 120 minutes, to obtain a modified graphite;

A mass ratio of the pretreated graphite raw material to the coal pitch was 1:0.4, and based on 100 wt % of a total mass of the pretreated graphite raw material, the coal pitch and the sodium chloride, the mass fraction of sodium chloride was 4%.

(3) The modified graphite was subjected to a heat treatment at 2800 ° C. under an argon atmosphere for 6 hours to obtain a heat-treated graphite.

(4) The heat-treated graphite was soaked in water, then filtered, dried, scattered and sieved to obtain the graphite anode material.

The graphite anode material prepared in this example was subjected to the swelling ratio and electrochemical performance tests according to the methods described in Example 1, and the test results are listed in Table 1.

Example 3

In this example, a low-swelling graphite anode material was prepared according to the following method.

(1) Flake graphite (having a carbon content greater than or equal to 95%) was mechanically crushed, graded with a grading machine, and shaped with a shaping machine to obtain a pretreated graphite raw material. The pretreated graphite raw material has a particle size D50 of 9.5 μm, a tap density of 0.902 g/cc, D90/D10 of 3.5, and a specific surface area of 7.8 m$^2$/g. The pretreated graphite raw material had an ellipsoid or irregular cuboid appearance, and a flaky internal structure, with a yield of about 82%.

(2) The pretreated graphite was mixed with coal pitch (having a softening point of 110° C.) and sodium chloride, and then the mixture was placed into a stirring heating tank for stirring and heating, during which the highest temperature was 350° C. and the temperature was held for 200 minutes to obtain a modified graphite;

A mass ratio of the pretreated graphite raw material to coal pitch was 1:0.3, and based on 100wt% of a total mass of the pretreated graphite raw material, the coal pitch and the sodium chloride, the mass fraction of sodium chloride was 6%.

(3) The modified graphite was subjected to a heat treatment at 2800° C. under an argon atmosphere for 6 hours to obtain a heat-treated graphite.

(4) The heat-treated graphite was soaked in water, filtered, dried, scattered and sieved to obtain the graphite anode material.

The graphite anode material prepared in this example was subjected to the swelling ratio and electrochemical performance tests according to the methods described in Example 1, and the test results are listed in Table 1.

Example 4

In this example, a low-swelling graphite anode material was prepared according to the following method.

(1) Flake graphite (having a carbon content greater than or equal to 95%) was mechanically crushed, graded with a grading machine, and shaped with a shaping machine to obtain a pretreated graphite raw material. The pretreated graphite raw material has a particle size D50 of 8 μm, a tap density of 0.907 g/cc, D90/D10 of 3 and a specific surface area of 10 m$^2$/g. The pretreated graphite raw material had an ellipsoid or irregular cuboid appearance, and a flaky internal structure, with a yield of about 81%.

(2) The pretreated graphite was mixed with coal tar and potassium chloride, and then the mixture was placed into a stirring heating tank for stirring and heating, during which the highest temperature was 50° C. and the temperature was held for 300 minutes, to obtain a modified graphite;

A mass ratio of the pretreated graphite raw material to the coal tar was 1:0.05, and based on 100 wt % of a total mass of the pretreated graphite raw material, the coal tar and the potassium chloride, a mass fraction of the potassium chloride was 10%.

(3) The modified graphite was subjected to a heat treatment at 1000° C. under an argon atmosphere for 10 hours to obtain a heat-treated graphite.

(4) The heat-treated graphite was soaked in water, filtered, dried, scattered and sieved to obtain the graphite anode material.

The graphite anode material prepared in this example was subjected to the swelling ratio and electrochemical performance tests according to the methods described in Example 1, and the test results are listed in Table 1.

Example 5

In this example, a low-swelling graphite anode material is prepared according to the following method.

(1) Flake graphite (having a carbon content greater than or equal to 95%) was mechanically crushed, graded with a grading machine, and shaped with a shaping machine to obtain a pretreated graphite raw material. The pretreated graphite raw material has a particle size D50 of 13 μm, a tap density of 0.901 g/cc, D90/D10 of 4 and a specific surface area of 3m$^2$/g. The pretreated graphite raw material had an ellipsoid or irregular cuboid appearance, and a flaky internal structure, with a yield of about 84%.

(2) The pretreated graphite was mixed with petroleum pitch and sodium nitrate, and then the mixture was placed into a stirring heating tank for stirring and heating, during which the highest temperature was 800° C. and the temperature was held for 100 minutes, to obtain a modified graphite;

A mass ratio of the pretreated graphite raw material to the petroleum pitch was 1:1, and based on 100 wt % of a total mass of the pretreated graphite raw material, the petroleum pitch and the sodium nitrate, a mass fraction of sodium nitrate was 3%.

(3) The modified graphite was subjected to a heat treatment at 3000° C. under an argon atmosphere for 2 h to obtain a heat-treated graphite.

(4) The heat-treated graphite was soaked in water, filtered, dried, scattered and sieved to obtain the graphite anode material.

The graphite anode material prepared in this example was subjected to the swelling ratio and electrochemical performance tests according to the methods described in Example 1, and the test results are listed in Table 1.

Example 6

The low-swelling graphite anode material in Example 6 is prepared with the similar method as that in Example 1, merely differing in that in step 1, the particle size D50 of the pretreated graphite raw material was 6 μm, and a yield was about 70%.

The graphite anode material prepared in this example was subjected to the swelling ratio and electrochemical performance tests according to the methods described in Example 1, and the test results are listed in Table 1.

Example 7

The low-swelling graphite anode material in Example 7 is prepared with the similar method as that in Example 1, merely differing in that in step 1, the particle size D50 of the pretreated graphite raw material was 20 μm and a yield was about 84%.

The graphite anode material prepared in this example was subjected to the swelling ratio and electrochemical performance tests according to the methods described in Example 1, and the test results are listed in Table 1.

Example 8

The low-swelling graphite anode material in Example 8 is prepared with the similar method as that in Example 1, merely differing in that in step 2, sodium chloride was not added, i.e., no pore-forming agent was added.

The graphite anode material prepared in this example was subjected to the swelling ratio and electrochemical performance tests according to the methods described in Example 1, and the test results are listed in Table 1.

Example 9

The low-swelling graphite anode material in Example 9 is prepared with the similar method as that in Example 1, merely differing in that in step 2, based on 100 wt % of a total mass of the pretreated graphite raw material, coal pitch and sodium chloride, the mass fraction of sodium chloride was 20%.

The graphite anode material prepared in this example was subjected to the swelling ratio and electrochemical performance tests according to the methods described in Example 1, and the test results are listed in Table 1.

Comparative Example 1

The low-swelling graphite anode material in Comparative Example 1 is prepared with the similar method as that in Example 1, merely differing in that in step 2, no coal pitch was added, i.e., no modifier was added.

The graphite anode material prepared in this example was subjected to the swelling ratio and electrochemical performance tests according to the methods described in Example 1, and the test results are listed in Table 1.

TABLE 1

| Sample | Swelling rate (%) | Specific capacity (mAh/g) | First coulombic efficiency (%) | 10 C/1 C discharge capacity retention rate (%) | Capacity retention rate after 300 cycles (%) |
|---|---|---|---|---|---|
| Example 1 | 24.2 | 358.1 | 96.1 | 94.4 | 91.2 |
| Example 2 | 22.1 | 359.1 | 95.8 | 93.8 | 92.5 |
| Example 3 | 23.2 | 360.4 | 95.4 | 94.5 | 92.3 |
| Example 4 | 24.3 | 359.2 | 95.9 | 95.3 | 92.1 |
| Example 5 | 22.8 | 356.4 | 95.2 | 92.3 | 93.1 |
| Example 6 | 27.8 | 357.4 | 95.8 | 95.3 | 92.3 |
| Example 7 | 28.6 | 359.7 | 95.3 | 91.2 | 91.9 |
| Example 8 | 26.1 | 358.3 | 95.7 | 90.5 | 90.2 |
| Example 9 | 26.9 | 358.9 | 93.1 | 93.5 | 89.5 |
| Comparative Example 1 | 30.5 | 365.2 | 88.5 | 95.2 | 80.1 |

In view of the above examples and comparative example, it can be known that the products prepared by the methods of Examples 1-5 have extremely low swelling rates, excellent cycle performances and outstanding rate performances. The graphite raw materials pretreated in Example 6 and Example 7 have particle sizes beyond the above optional ranges. Specifically, the particle size of the graphite raw material pretreated in Example 6 was too small, resulting in a lower yield of the pretreated graphite raw material and deteriorated performance of the products; and the particle size of the graphite raw material pretreated in Example 7 was too large, resulting in a significant increase in the swelling rate. In Example 8, no pore-forming agent is added, which leads to a reduction in the rate performance of the product. In Example 9, excessive pore-forming agent was added, which reduces the first coulombic efficiency and the capacity retention rate after 300 cycles of the product. In Comparative Example 1, due to the absence of the modifier, the excellent effect of the present application could not be reached.

The above-mentioned embodiments are described to explain the detailed method of the present application, but are not intended to limit the present application. That is, the present application can be implemented not merely depending upon the above-mentioned detailed methods. Those skilled in the art understand that any improvements to the present application, equivalent replacements of raw materials of the product of the present application, additions of auxiliary components, selections of specific methods, etc., shall fall within the protection scope and the disclosure of the present application.

What is claimed is:

1. A preparation method of a graphite anode material, the method comprising:
   step 1 of mixing and then heating a graphite raw material, a modifier and a pore-forming agent to obtain a modified graphite;
   step 2 of performing a heat treatment on the modified graphite obtained in step 1 under a protective atmosphere to obtain a heat-treated graphite; and
   step 3 of subjecting the heat-treated graphite in step 2 to a post-treatment to obtain the graphite anode material.

2. The preparation method according to claim 1, wherein the graphite raw material in step 1 has a particle size D50 of 8 μm to 13 μm, and 3≤D90/D10≤4; and/or
   the graphite raw material in step 1 has an ellipsoid appearance or an irregular cuboid appearance, and a flaky internal structure.

3. The preparation method according to claim 1, wherein in step 1, the graphite raw material is a natural graphite.

4. The preparation method according to claim 1, wherein the modifier in step 1 a softening point of 50° C. to 400° C.

5. The preparation method according to claim 1, wherein the heating in step 1 is performed at a temperature of 50° C. to 800° C.; and
   a time duration of the heating in step 1 is greater than 0 min and shorter than or equal to 300 min.

6. The preparation method according to claim 1, wherein the protective atmosphere in step 2 is selected from the group consisting of a helium atmosphere, a neon atmosphere, an argon atmosphere, a nitrogen atmosphere, a krypton atmosphere, and combinations thereof; and/or
   the heat treatment in step 2 is performed at a temperature of 1000° C. to 3000° C., the heat treatment in step 2 is performed for 1 h to 10 h.

7. The preparation method according to claim 1, wherein the post-treatment in step 3 comprises: subjecting the heat-treated graphite in step 2 to soaking, solid-liquid separation, drying, scattering and sieving; or
   the post-treatment in step 3 comprises: subjecting the heat-treated graphite in step 2 to soaking, solid-liquid separation, drying, scattering and sieving, wherein said soaking is soaking in water; or
   the post-treatment in step 3 comprises: subjecting the heat-treated graphite in step 2 to soaking, solid-liquid separation, drying, scattering and sieving, wherein the solid-liquid separation is filtration; or
   the post-treatment in step 3 comprises: subjecting the heat-treated graphite in step 2 to soaking, solid-liquid separation, drying, scattering and sieving, wherein said soaking is soaking in water and the solid-liquid separation is filtration.

8. The preparation method according to claim 1, comprising:
   step 1' of mechanical crushing flake graphite, grading with a grading machine, and shaping with a shaping machine to obtain a pretreated graphite raw material, wherein the flake graphite is flake crystalline graphite obtained by processing natural graphite ore, and has a having a carbon content greater than or equal to 95%; and the pretreated graphite raw material has an ellipsoid appearance or an irregular cuboid appearance and a flaky internal structure, a particle size D50 of 8 μm to 13 μm, 3≤D90/D10≤4, a tap density≥0.9 g/cc, and a specific surface area of 3 m2/g to 10 m2/g;
   step 2' of mixing the pretreated graphite raw material in step 1' with a modifier and a water-soluble salt pore-forming agent, and then performing heating at a temperature of 50° C. to 800° C. for 120 min to 180 min under stirring, to obtain the modified graphite, wherein a mass ratio of the pretreated graphite raw material to the modifier ranges from 1:0.05 to 1:1, and based on 100 wt % of a total mass of the pretreated graphite raw material, the modifier and the water-soluble salt pore-forming agent, a mass fraction of the water-soluble salt pore-forming agent ranges from 4 wt % to 6 wt %, and the soluble salt pore-forming agent is selected from the group consisting of sodium chloride, potassium chloride, potassium nitrate, sodium nitrate, sodium sulfate, potassium sulfate, and combinations thereof;

step 3' of performing the heat treatment on the modified graphite described in step 2' under a protective atmosphere at 1000° C. to 3000° C. for 1 h to 10 h, to obtain the heat-treated graphite; and step 4' of soaking the heat-treated graphite in step 3' in water, then filtering, then drying, scattering and sieving, to obtain the graphite anode material.

9. A graphite anode material, prepared by the preparation method according to claim 1.

10. A lithium ion battery, comprising the graphite anode material according to claim 9.

11. The preparation method according to claim 1, wherein the graphite raw material in step 1 has a tap density greater than or equal to 0.9 g/cc; and the graphite raw material in step 1 has a specific surface area of 3 m2/g to 10 m2/g.

12. The preparation method according to claim 1, wherein the pore-forming agent is a water-soluble salt pore-forming agent.

13. The preparation method according to claim 12, wherein the water-soluble salt pore-forming agent comprises one selected from the group consisting of sodium chloride, potassium chloride, potassium nitrate, sodium nitrate, sodium sulfate, potassium sulfate, and combinations thereof.

14. The preparation method according to claim 12, wherein in step 1, based on 100 wt % of a total mass of the graphite raw material, the modifier and the pore-forming agent, a mass fraction of the pore-forming agent is greater than 0 wt % and smaller than or equal to 10 wt %.

15. The preparation method according to claim 3, wherein the natural graphite comprises one of:

flake graphite;

flake crystalline graphite obtained by processing natural graphite ore; or flake graphite having a carbon content greater than or equal to 95%.

16. The preparation method according to claim 1, wherein in step 1, the graphite raw material is first subjected to a pretreatment before being mixed with the modifier.

17. The preparation method according to claim 16, wherein the pretreatment comprises crushing and grading; or the pretreatment comprises mechanical crushing and grading; or the pretreatment comprises crushing and grading performed with a grading machine; or the pretreatment comprises mechanical crushing and grading performed with a grading machine; or the pretreatment comprises mechanical crushing, grading and shaping; or the pretreatment comprises mechanical crushing, grading and shaping; or the pretreatment comprises mechanical crushing, grading and shaping performed with a shaping machine.

18. The preparation method according to claim 1, wherein the modifier in step 1 is selected from the group consisting of phenolic resin, epoxy resin, petroleum resin, coal pitch, petroleum pitch, mesophase pitch, coal tar, heavy oil, and combinations thereof.

19. The preparation method according to claim 1, wherein in step 1, a mass ratio of the graphite raw material to the modifier ranges from 1:0.05 to 1:1.

\* \* \* \* \*